Dec. 27, 1966  J. A. DREYER  3,294,094
MACHINE FOR HARVESTING COMESTIBLES
Filed Sept. 9, 1963  9 Sheets-Sheet 1
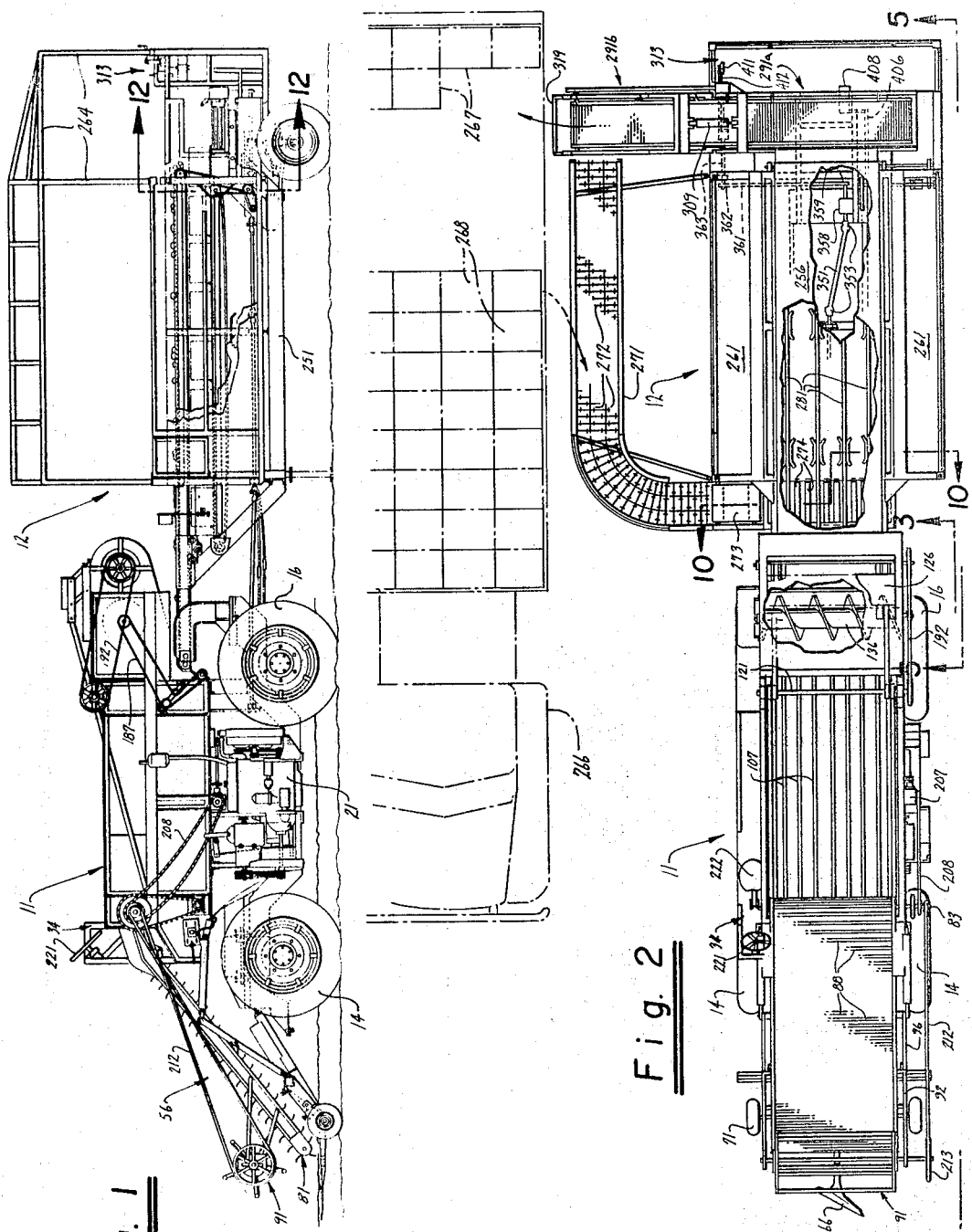
INVENTOR.
John A. Dreyer
BY
Attorneys Dec. 27, 1966  J. A. DREYER  3,294,094
MACHINE FOR HARVESTING COMESTIBLES
Filed Sept. 9, 1963  9 Sheets-Sheet 2

INVENTOR.
John A. Dreyer
BY
Attorneys

Dec. 27, 1966   J. A. DREYER   3,294,094
MACHINE FOR HARVESTING COMESTIBLES
Filed Sept. 9, 1963   9 Sheets-Sheet 3
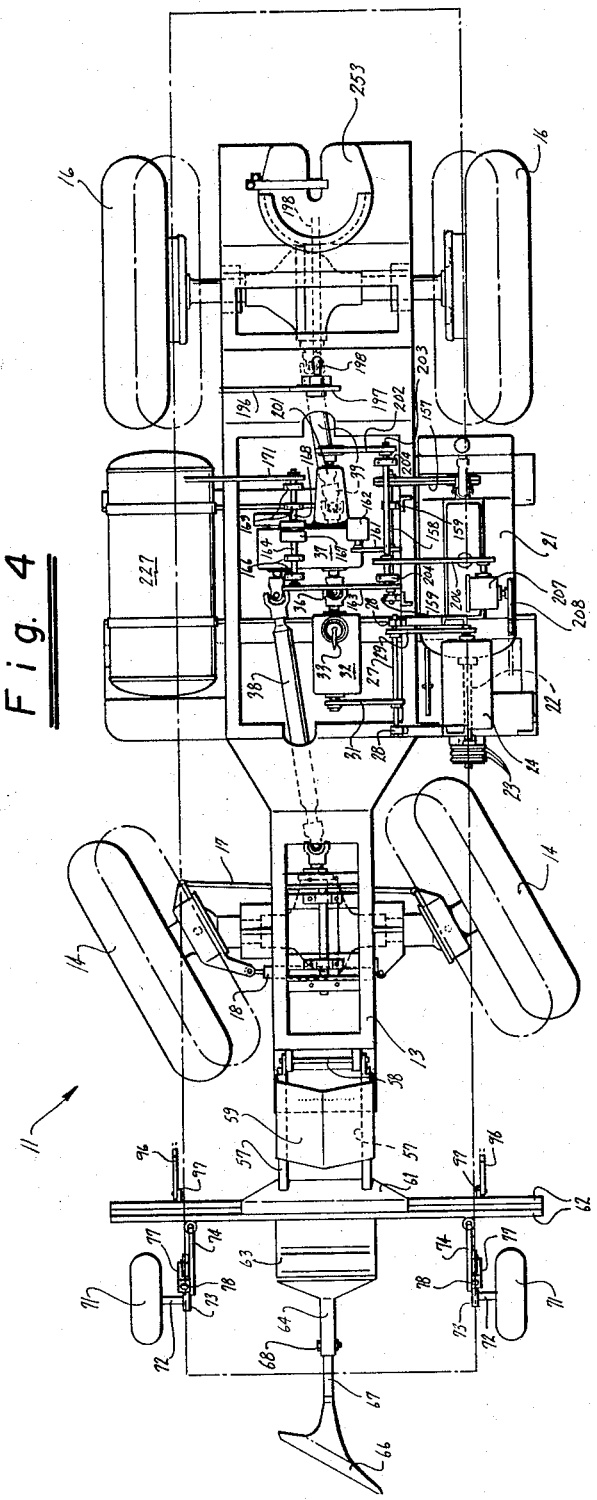
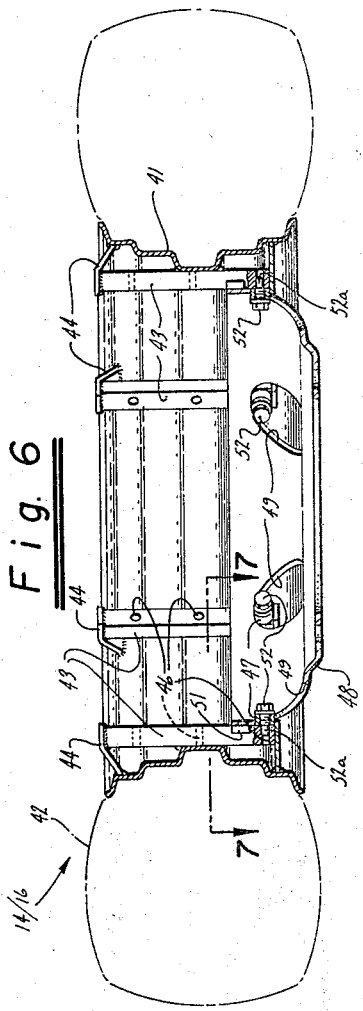
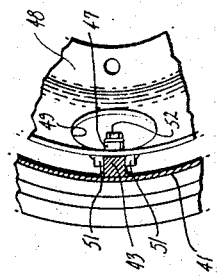
INVENTOR.
John A. Dreyer
BY
Attorneys

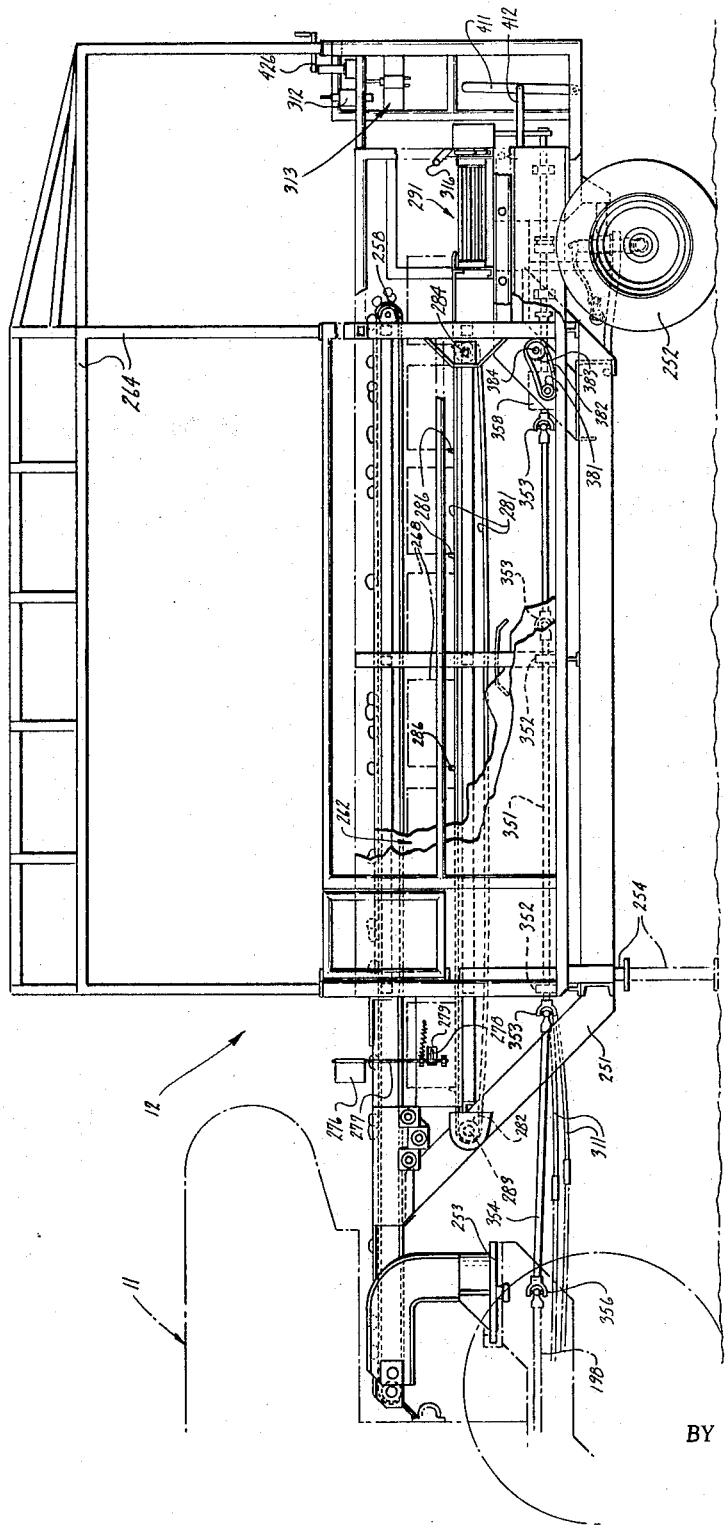

Dec. 27, 1966  J. A. DREYER  3,294,094
MACHINE FOR HARVESTING COMESTIBLES
Filed Sept. 9, 1963  9 Sheets-Sheet 5

INVENTOR.
John A. Dreyer
BY
*Attorneys*

Dec. 27, 1966  J. A. DREYER  3,294,094
MACHINE FOR HARVESTING COMESTIBLES
Filed Sept. 9, 1963  9 Sheets-Sheet 6

INVENTOR.
John A. Dreyer
BY
Attorneys

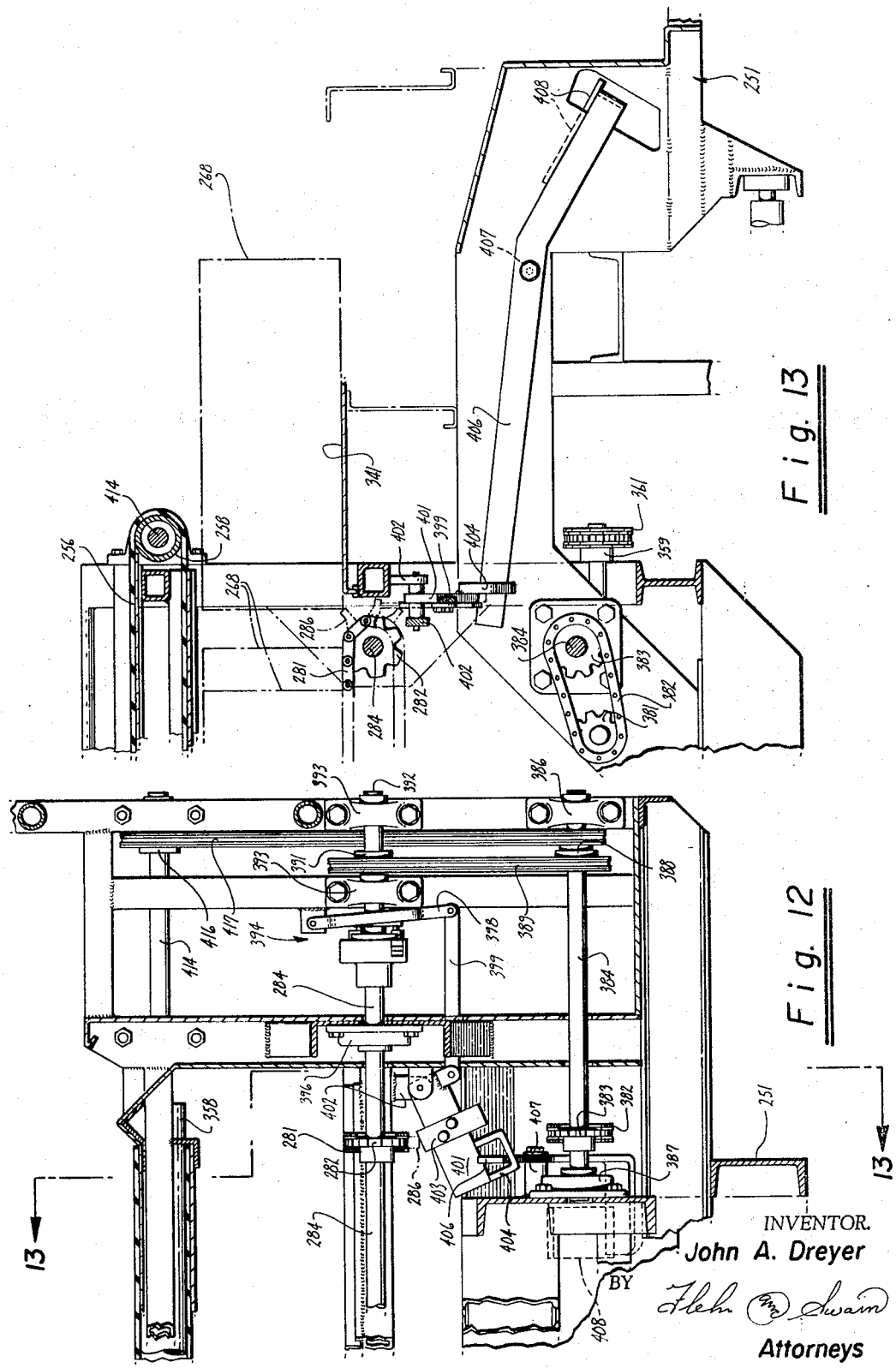

Dec. 27, 1966 J. A. DREYER 3,294,094
MACHINE FOR HARVESTING COMESTIBLES
Filed Sept. 9, 1963 9 Sheets-Sheet 8
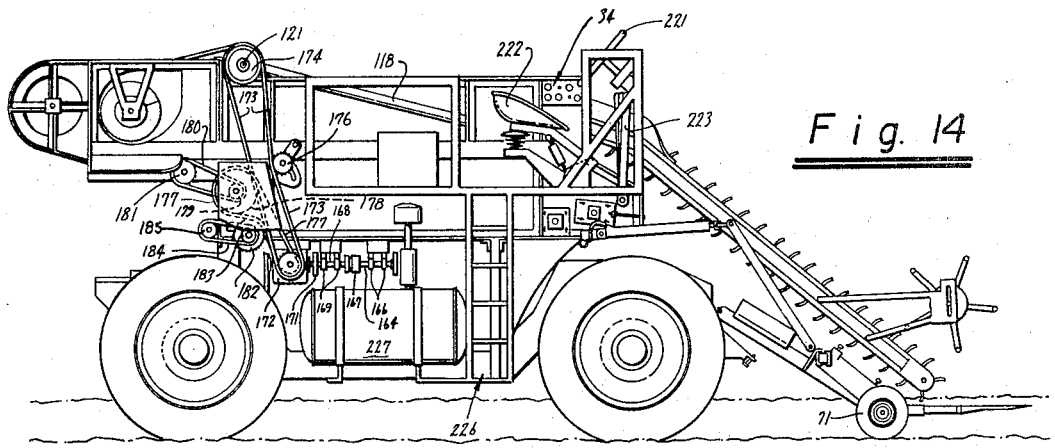
Fig. 14
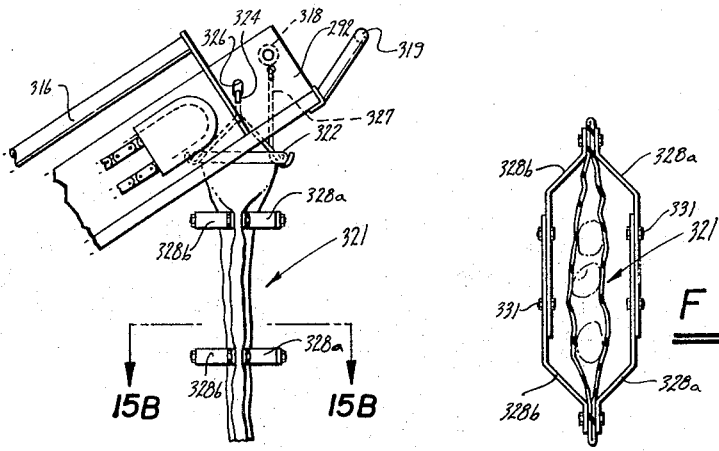
Fig. 15A
Fig. 15B
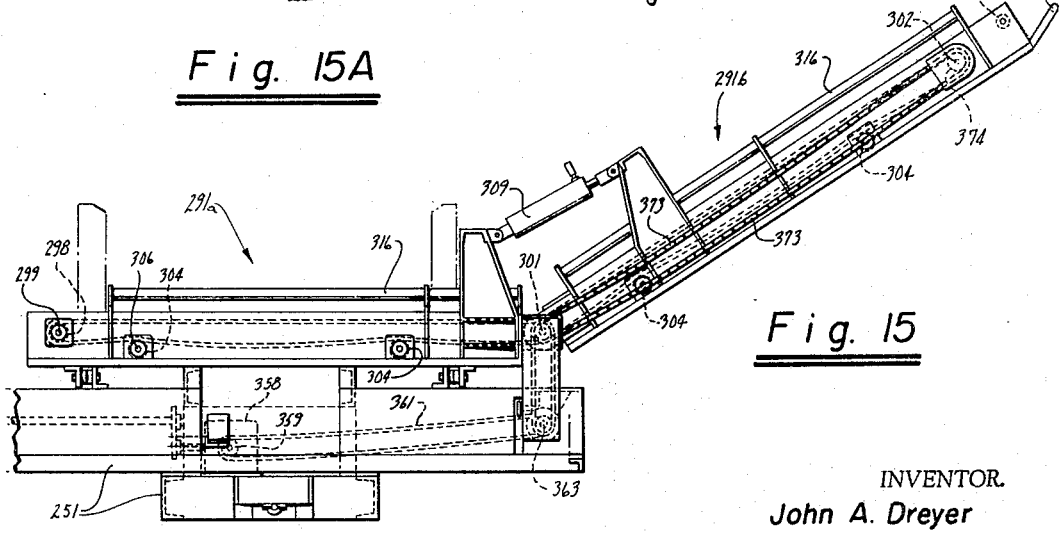
Fig. 15
INVENTOR.
John A. Dreyer
BY
Attorneys

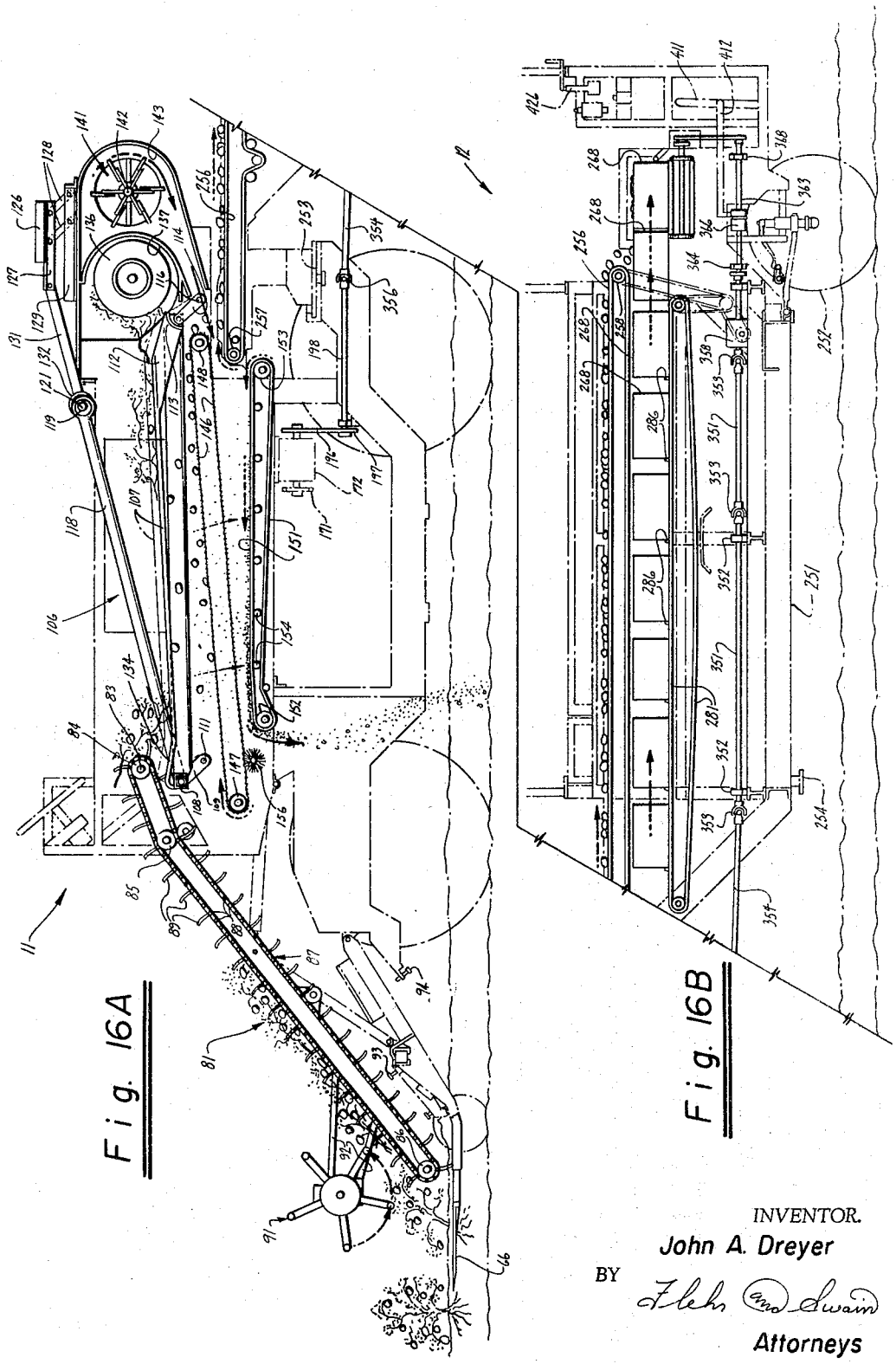

United States Patent Office 3,294,094
Patented Dec. 27, 1966

3,294,094
MACHINE FOR HARVESTING COMESTIBLES
John A. Dreyer, Castro Valley, Calif., assignor to Benner-Nawman, Inc., Oakland, Calif., a corporation of California
Filed Sept. 9, 1963, Ser. No. 307,466
4 Claims. (Cl. 130—30)

This invention relates to a machine for harvesting comestibles and more particularly to a machine for harvesting tomatoes.

Numerous attempts have been made to harvest relatively fragile fruits and vegetables, and in particular tomatoes, in order to eliminate the use of very arduous hand labor. Such machines have not been entirely successful because they have often damaged or bruised the tomatoes, and also in that they have failed to eliminate dirt or leaves, etc., from the tomatoes. There is, therefore, a need for a new and improved machine for harvesting comestibles.

In general, it is an object of the present invention to provide a machine for harvesting comestibles, and in particular tomatoes, which overcomes the above named disadvantages.

Another object of the invention is to provide a machine of the above character in which the tomatoes which have been harvested can be packed in either bins or boxes.

Another object of the invention is to provide a machine of the above character in which a separate detachable unit is provided for sorting the comestibles and for filling boxes or bins with the comestibles.

Another object of the invention is to provide a machine of the above character which is self-propelled and can readily travel down conventional highways.

Another object of the invention is to provide a machine of the above character in which a unique shaker mechanism is utilized for separating the tomatoes from the tomato plants.

Another object of the invention is to provide a machine of the above character in which the travel of the tomatoes on the shaker mechanism is controlled by the shaker mechanism.

Another object of the invention is to provide a machine of the above character which can be used for harvesting thin-skinned tomatoes.

Another object of the invention is to provide a machine of the above character in which the boxes to be filled can be readily advanced into a position in which they can be filled.

Another object of the invention is to provide a machine of the above character in which conveyor means is provided for advancing the boxes and wherein the conveyor means is halted when the box has been advanced to the proper position.

Additional objects and features of the invention will appear from the following description in which the preferred embodiment is set forth in detail in conjunction with the accompanying drawings.

Referring to the drawings:

FIGURE 1 is a side elevational view of a machine for harvesting comestibles incorporating my invention.

FIGURE 2 is a top plan view of the machine shown in FIGURE 1.

FIGURE 4 is a cross-sectional view taken along the line 4—4 of FIGURE 3.

FIGURE 5 is an enlarged view looking along the line 5—5 of FIGURE 2.

FIGURE 6 is a cross-sectional view of one of the wheels used on the harvester.

FIGURE 7 is a cross-sectional view taken along the line 7—7 of FIGURE 6.

FIGURE 12 is a cross-sectional view taken along the line 12—12 of FIGURE 1.

FIGURE 13 is a cross-sectional view taken along the line 13—13 of FIGURE 12.

FIGURE 14 is a side elevational view of the tractor harvester unit opposite the side shown in FIGURE 3.

FIGURE 15 is a view looking along the line 15—15 of FIGURE 2 and shows the discharge conveyor.

FIGURE 15A is a view similar to FIGURE 15 showing a portion of the discharge conveyor with a chute attached for filling bins.

FIGURE 15B is a cross-sectional view taken along the line 15B—15B of FIGURE 15A.

FIGURES 16A and 16B are semi-schematic illustrations of my machine for harvesting comestibles showing the machine in operation.

Figure 3:
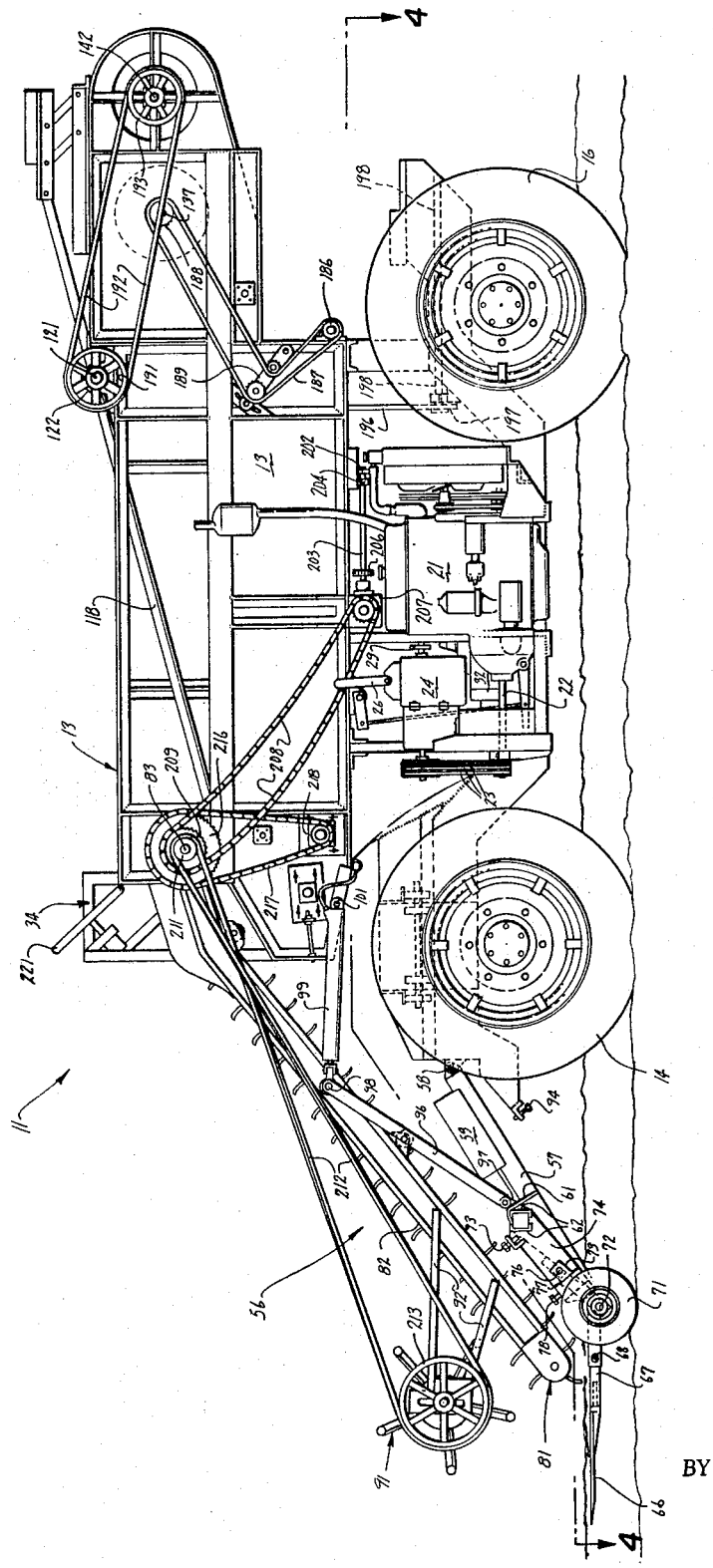
FIGURE 3 is an enlarged side elevational view looking along the line 3—3 of FIGURE 2.

In general, my machine for harvesting comestibles consists of a wheeled framework. A shaker mechanism is mounted on the wheeled framework and has spaced apart members. Means is mounted on the framework and includes inclined pivotally mounted rocker arms connected to the shaker members for causing vibratory movement of the shaker members. Means is provided for delivering comestible bearing plants to the shaker mechanism so that the shaker mechanism can separate the comestibles from the plants and to permit the separated comestibles to drop between the spaced apart members of the shaker mechanism. Conveyor means is provided for receiving the comestibles as they drop through the shaker mechanism. A sorting and filling mechanism is provided which receives the comestibles from the conveyor and is arranged to deliver the sorted comestibles into either boxes or bins.

*Tractor harvester unit*

As shown in the drawings, my machine for harvesting comestibles consists of a self-propelled tractor harvester unit 11 and a sorting and filling unit 12 which is normally connected to and pulled by the tractor harvester unit. The tractor harvester unit 11 consists of a framework 13 upon which are mounted steerable powered front wheels 14 and rear wheels 16. The front wheels 14 are interconnected by a tie rod 17 and are steered by suitable means such as a hydraulic cylinder 18 (see FIGURE 4).

The tractor harvester unit 11 is powered by suitable means such as a governor-controlled internal combustion engine or motor 21 which is mounted on one side of the framework between the front and rear wheels as shown particularly in FIGURES 3 and 4. The motor 21 is provided with a conventional clutch mechanism (not shown) which is used for driving a rear drive shaft 22 which, through V-belts 23, drives a transmission 24 of a suitable type such as a three-speed transmission manufactured by the Funk Manufacturing Co. of Coffeyville, Kansas. A 2:1 reduction is obtained in the V-belt drive between the drive shaft 22 and the transmission 24. The transmission 24 is provided with a manual shift lever 26 for shifting the same to provide the various output speeds. The output shaft of the transmission 24 drives a jack shaft 27 rotatably mounted in pillow blocks 28 provided on the framework 13 by means of a chain 29. The jack shaft 27 drives a chain 31 which drives a transmission 32 of a conventional type such as a truck-type transmission which has four forward speeds and one reverse speed. The transmission 32 is provided with an operating lever 33 which is operated from the driving station 34 provided on the tractor harvester unit. The transmission 32 is connected by universal joint 36 to a transfer case 37 of a conventional type. The transfer case includes clutch means and drives a front drive line linkage 38 and a rear wheel drive line linkage 39 of substantially conventional types to provide power for driving the front and rear wheels 14 and 16.

By the use of the two transmissions 24 and 32, it is possible to obtain a very large combination of speeds so that the complete harvesting unit can travel at relatively high speeds while on the highway and still can be made to travel at very slow speeds as, for example .03 to 1½ miles per hour during the time that harvesting is being accomplished.

In order to facilitate harvesting crops having different widths between the rows, the wheels 14 and 16 are adjustable laterally as shown by the broken lines in FIGURE 4. As shown particularly in FIGURES 6 and 7, each of the wheels consists of a rim 41 upon which the tire 42 is mounted. A plurality of circumferentially spaced support bars 43 are secured to the inner annular surface of the rim 41 by suitable means such as lugs 44. The support bars are provided with radially extending holes 46 which are spaced longitudinally of the bars. Cylindrical lugs 47 are secured at circumferentially spaced points of a wheel member 48 by suitable means such as welding the lugs to the wheel member 48 in the holes 49. Spaced pairs of guide lugs 51 are secured to the wheel member 48 by suitable maens such as welding adjacent the cylindrical lugs 47. The guide lugs 51 are spaced apart so they are adapted to engage opposite sides of the support bar 43 as shown particularly in FIGURE 7. Cap screws 52 are threaded into the lugs 47 and have extensions 52a which extend into the holes 46 provided in the support bars 43 to thereby retain the wheel member 48 in engagement with the rim 41 of the wheel.

It can be seen that merely by removing the cap screws 52, the wheel member 48 can be adjusted longitudinally of the bars 43 so that the cap screws 52 can be positioned in the other holes 46. Thus, with the number of holes shown, each of the wheels can be adjusted to three different positions. It is readily apparent that, if desired, additional holes can be provided to obtain additional positions.

The tractor harvester unit 11 also consists a knife and pickup assembly 56 which is mounted on the front end of the framework 13. This assembly 56 consists of a pair of spaced parallel forwardly extending members 57 which are pivotally mounted on the front end of the framework by suitable means such as pins 58. A reinforcing member 59 is mounted upon the members 57. A plate 61 is secured to a pair of laterally extending channel members 62. A plate-like member 63 is secured to the channel members 62 and is provided with a hollow rectangular extension 64. A knife blade 66 which is provided with a rectangular shank 67 has its shank 67 disposed in the extension 64 and is adjustably secured therein by a bolt 68 extending through the holes (not shown) in the shank 67 and in the extension 64.

As can be seen particularly from FIGURE 3, means is provided for supporting the channel members 62 so that the knife blade 66 travels just below the surface of the earth. This means consists of a pair of wheels 71 which are rotatably mounted upon stub shafts 72 secured to bars 73. The bars 73 are pivotally connected to forwardly extending plates 74 by pins 76. The plates 74 are affixed to the channel members 62. The members 73 extend through U-shaped members 77 secured to the members 74 and are retained therein in a predetermined position relative to the pivot points 76 by bolts 78 which are threaded into the U-shaped members 77 and which engage the members 73.

The knife and pickup assembly 56 also includes a pickup conveyor 81. This pickup conveyor consists of a framework 82 which has its upper forward end pivotally connected to the framework 13 of the tractor harvester unit on a shaft 83. Three separate rollers 84, 85 and 86 are rotatably mounted in the conveyor framework 82 and carry an endless chain belt type of conveyor 87 comprised of a plurality of interconnected laterally extending rods 88 having curved fingers 89 mounted thereon extending at substantially right angles to the rods. As shown in FIGURE 2, the rods 88 are spaced in relatively close proximity to each other so that tomatoes or other articles being picked will not fall through the same. A reel 91 is rotatably mounted upon members 92 secured to the framework 82 of the pickup conveyor.

Stops 93 are provided on the members 74 to prevent the pickup conveyor 81 from coming into direct contact with the structure carrying the knife blade 66. A rest 94 is provided on the framework 13 of the tractor harvester unit to limit the downward movement of the knife 66 when the knife and pickup assembly is raised.

Means is provided for raising and lowering the knife and pickup assembly 56 as a unit and also for maintaining a desired spacing between the pickup conveyor and the knife 66. This means consists of a pair of lever arms 96 which have their lower ends pivotally connected to lugs 97 (FIGURE 4) secured to the channel members 62. The upper ends of the lever arms 96 are pivotally connected to hydraulic actuators 99 which are pivotally connected at 101 to the main framework 13. It can be seen that as the hydraulic actuators are operated, the upper ends of the lever arms 96 will be pushed to the left as viewed in FIGURE 3 to first cause raising of the wheeled structure and the knife 66. Thereafter, continued operation of the hydraulic actuators 99 will cause the wheeled structure to come into contact with the pickup conveyor 81 to also cause it to be lifted so that both the wheeled structures and the pickup conveyor are lifted a substantial height above the ground so that the entire machine can be readily turned about in the field or can travel on the highway.

The comestible bearing plants being harvested are delivered by the pickup conveyor 81 to a particularly novel shaker mechanism 106 which serves to separate comestibles from the plants as hereinafter described. The shaker mechanism 106 consists of a plurality of spaced parallel members 107 having rounded upper surfaces which extend longitudinally of the framework 13 and which, as shown particularly in FIGURE 2, are spaced far enough apart so that the comestibles being harvested can drop therebetween. The forward extremities of the members 107 are secured to a transversely extending member 108 which is secured to inclined rocker arms 109. The rocker arms 109 are pivotally mounted for movement about points 111. It will be noted that in the position of the shaker mechanism shown in FIGURE 16A that the rocker arms are inclined at an angle of approximately 45°. The other ends of the shaker members 107 are secured to downwardly extending extensions 112 of substantially rectangular cross-section which are secured to a transversely extending arcuate member 113. The arcuate member 113 is pivotally secured to inclined rocker arms 114 which are pivotally mounted for movement about points 116. The arms 114 are inclined at substantially the same angle as arms 109.

The shaker members 107 are spaced so that the largest tomatoes which will be picked can fall between the same as, for an example, a spacing of 3½ inches. The shaker members are also mounted so that they are inclined upwardly towards the rear at a substantial angle as, for example, an angle of approximately 10°.

The shaker mechanism 106 also includes a pair of shaker arms 118 which have their ends pivotally connected to the member 108 and which have their other ends rotatably mounted on ball bearing eccentrics 119 secured to a shaft 121. The shaft 121 is rotatably mounted in pillow blocks 122 provided on opposite sides of the framework 13. The eccentrics 119 are dimensioned such that their throw is approximately 5/8 of an inch and so the total travel is 1¼ inches. It will be noted that the angle of the rocker arms 109 and 114 is approximately 45° so that upon rotation of the eccentrics 119, the resultant movement of the shaker members 107 is such that the lift is substantially equal to the distance of forward travel. It is readily apparent that these resultant movements can be readily changed by changing the angle of the rocker arms 109 and 114 and by changing the length of the connecting shaker arms 118.

The shaker mechanism 106, with its associated drives, comprises a substantial mass which must be rapidly shifted during operation of the machine. For that reason, it is desirable to provide counter-balancing means of a suitable type. One type of counter-balancing means which is shown in the drawings consists of a large plate 126 of approximately the same weight as the entire shaker mechanism 106 which is secured to a pair of angle members 127. The angle members 127 are pivotally connected to rocker arms 128 which are also pivotally connected to angle members 129 which are mounted upon the framework 13 of the machine. Connecting arms 131 are pivotally connected to the members 127 and are driven by ball bearing eccentrics 132 affixed to the shaft 121. The eccentrics 132 are arranged so that they are 180° out of phase with the eccentrics 119 provided for driving the shaker arms 118.

It will be noted that the rocker arms 128 are inclined at the same angle that the rocker arms 119 and 114 are inclined so that the forces which must be overcome in the shaker mechanism 106 are counter-balanced by the counter-balancing mechanism hereinbefore described. For each and every force created in the shaker mechanism, an equal and opposite force is created by the counter-balancing mechanism.

A pickup draper is mounted on the forward end of the shaker mechanism 106 and consists of L-shaped rod-like members 134 which are mounted on the forward end of the shaker mechanism upon the shaker members 107 and 108 and which extend upwardly therefrom and in between the fingers 89 provided on the pickup conveyor 81 to prevent the comestible being harvested from being carried along with the shaker mechanism.

Means is provided for removing vines and other refuse which does not pass through the shaker mechanism and consists of an auger 136 which is rotatably mounted in the framework 13 immediately to the rear of the shaker mechanism. A shroud or housing 137 is provided to the rear of the auger 136 so that the material which enters the auger will be discharged in the direction of the arrow as shown in FIGURE 2 and onto the ground. It will be noted that the shaker mechanism 106 is formed with the members 112 which have surfaces which are inclined downwardly towards the rear so that the vines from which the comestibles have been harvested will slide into the auger by gravity, and thus will be positively fed into the auger so that they can readily discharged from the machine.

A blower 141 is mounted upon a shaft 142 rotatably mounted upon the framework 13 immediately behind the auger 136. A housing 143 is also mounted upon the framework 13 and encloses the blower so that air from the blower is discharged forwardly and downwardly as shown by the arrows in FIGURE 16A to provide a substantial quantity of air passing beneath the shaker mechanism and upwardly through the shaker mechanism to prevent leaves and other relatively light debris from falling through the shaker mechanism and to be carried rearwardly into the auger.

A comestible belt 146 is mounted beneath the shaker mechanism 106 and serves to receive the comestibles as they are shaken from the vines. This comestible belt 146 is preferably a rather porous type so that dirt, stones and other small objects can fall through the same. For this reason, I have found it desirable to construct this belt of spaced interconnected rods which are formed into a belt and which pass over rollers 147 and 148. The rollers 147 and 148 are rotatably mounted upon the framework 13 and are positioned in such a manner that the upper surface of the belt is inclined upwardly and to the rear to help ensure that any dirt, rocks and other foreign objects are separated from the comestibles before they pass from the harvesting unit. The comestibles dropping through the shaker mechanism are thus picked up by the comestible belt 146 and carried to the rear of the tractor harvester unit 11 as shown particularly in FIGURE 16A.

The dirt and other debris falling through the comestible belt 146 falls upon a dirt belt 151 which is formed of a suitable imperivous material such as rubber. The endless dirt belt 151 is mounted upon rollers 152 and 153 rotatably mounted in the framework 13. Additional smaller rollers 154 are provided for supporting the upper run of the dirt belt and for maintaining the dirt belt under the proper tension. As shown in FIGURE 16A, the direction of travel of the dirt belt is such that the dirt is moved forwardly in the direction in which the air is being pushed through the machine by the fan 141 so that the dirt drops downwardly onto the ground immediately behind the front wheels 14 of the tractor harvester unit 11. A cylindrical brush 156 of suitable material such as nylon bristles is rotatably mounted in the framework 13 and is provided for brushing the underside of the comestible belt 146 to remove any dirt and debris which may have been collected from the belt and which has not fallen from the belt. Any dirt and debris removed by the brush 156 will also fall downwardly with the dirt which is passing from the dirt belt 151.

*Drive mechanism of tractor harvester unit*

The drive mechanism for operating the various parts hereinbefore described of the tractor harvester unit will now be briefly described as follows. The drive mechanism for propelling the tractor harvester unit 11 itself has already been described. The motor 21, in addition, drives V-belts 157 which drive a jack shaft 158 rotatably mounted in pillow blocks 159. The jack shaft 158 drives a chain 161 which drives a hydraulic pump 162 which is utilized for supplying hydraulic fluid under pressure to the hydraulic system utilized on the tractor harvester unit. The jack shaft 158 also drives a chain 163 which drives another jack shaft 164 rotatably mounted upon the framework 13 by pillow blocks 166. The jack shaft 164 is connected to the clutch 167. The clutch 167 is connected to another jack shaft 168 and is adapted to drive the same. The jack shaft 168 is rotatably mounted in pillow blocks 169. The jack shaft 168 drives a chain 171 which drives a right-angle gear box 172. The right-angle gear box (see FIGURE 14) drives a chain 173 which drives a sprocket 174 mounted upon the shaft 121 which drives the eccentrics 119 and 132. A chain tightener 176 is provided for tightening the chain 173. The right-angle gear box 172 also drives a chain 177 which drives a sprocket 178. The sprocket 178 drives a sprocket 179 which drives a chain 180 which drives a sprocket 181. The sprocket 181 is mounted on the roller 148 and drives the roller 148 to drive the comestible belt 146. The chain 177 also drives a sprocket 182. The sprocket 182 drives a sprocket 183 which drives a chain 184. The chain 184 drives a sprocket 185. The sprocket 185 is affixed to the roller 153 which is used for driving the dirt belt 151.

On the other side of the tractor harvester unit (see FIGURE 3), a sprocket 186 is mounted on the roller 153 and drives a chain 187. The chain 187 drives a sprocket 188 which is affixed to the shaft 137 for the auger 136. Chain tightening and guiding means 189 is mounted on the framework 13, as shown particularly in FIGURE 3, for guiding and tightening the chain 187.

A pulley 191 is mounted on the shaft 121 and drives a belt 192 (see FIGURE 3). The belt 192 drives a pulley 193 which is mounted on the shaft 142 for the fan 141.

From the foregoing description of the drive mechanism, it can be seen that by operating the clutch 167, the shaker mechanism 106, the auger 136 and the fan 141 can be placed in operation or taken out of operation independent of the operation of the other parts of the tractor harvester unit.

The right-angle gear box 172 also drives a chain 196 which drives a sprocket 197 which is affixed to a line drive shaft 198 which is rotatably mounted upon the framework 13. As hereinafter described, this line drive shaft 198 is utilized for driving the operating mechanism of the sorting and filling unit. Thus, it can be seen that the operation of the mechanism of the sorting and filling unit 12 is also under the control of the clutch 167.

The drive mechanism for operating the various moving parts of the tractor harvester unit 11 also includes a power take-off unit 201 which is mounted on the transfer case 37. This power take-off 201 drives a chain 202 which drives a jack shaft 203. The jack shaft 203 is rotatably mounted upon the framework 13 by suitable means such as pillow blocks 204. The jack 203 drives a chain 206 which drives a right angle gear box 207 mounted upon the framework 13. The right-angle gear box 207 drives a chain 208 which drives a sprocket 209 affixed to the shaft 83, and thus serves to drive the pick-up conveyor 81. A pulley 211 is mounted on the shaft 83 and drives a belt 212 which drives a pulley 213 which drives the reel 91. Another sprocket 216 is affixed on the shaft 83 and drives a chain 217 which drives a sprocket 218 which drives the brush 156.

From the foregoing, it can be seen that the reel 91, the pick-up conveyor 81 and the brush 156 are connected through the power take-off 201 to the mechanism for driving the wheels of the vehicle so that when the tractor harvester unit 11 is stopped, the reel 91 and the pick-up conveyor 81 also stops.

The operator's driving station 34 for the tractor harvester unit 11 is shown particularly in FIGURE 14 and includes a steering wheel 221 which controls the flow of fluid to the fluid actuator 18, a seat 222 and various control levers 223. Such control levers include the following: a control lever for operating the brakes for rear wheels 16 of the tractor harvester unit, a control lever for operating the clutch 167 on the jack shaft for controlling the operation of the shaker mechanism 106 and the comestible belt 146 and the dirt belt 151; a control lever for operating the clutch on the motor 21 and a control lever for operating the clutch on the power take-off 201. There is, in addition, a control lever (not shown) for shifting and operating the lever 33 for the transmission 32.

A ladder 226 is provided for entering the driving station 34. A feul tank 227 is provided adjacent the ladder and supplies fuel for the motor 21.

*Sorting and filling unit*

Figure 9:
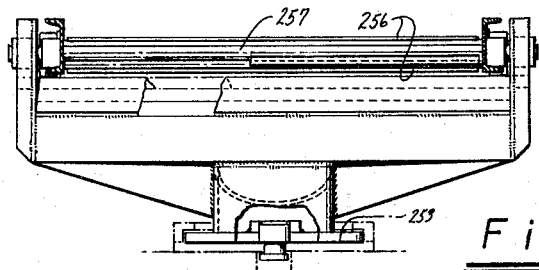
FIGURE 9 is an enlarged view showing the means for connecting the sorting and filling unit to the tractor harvesting unit.
Figure 10:
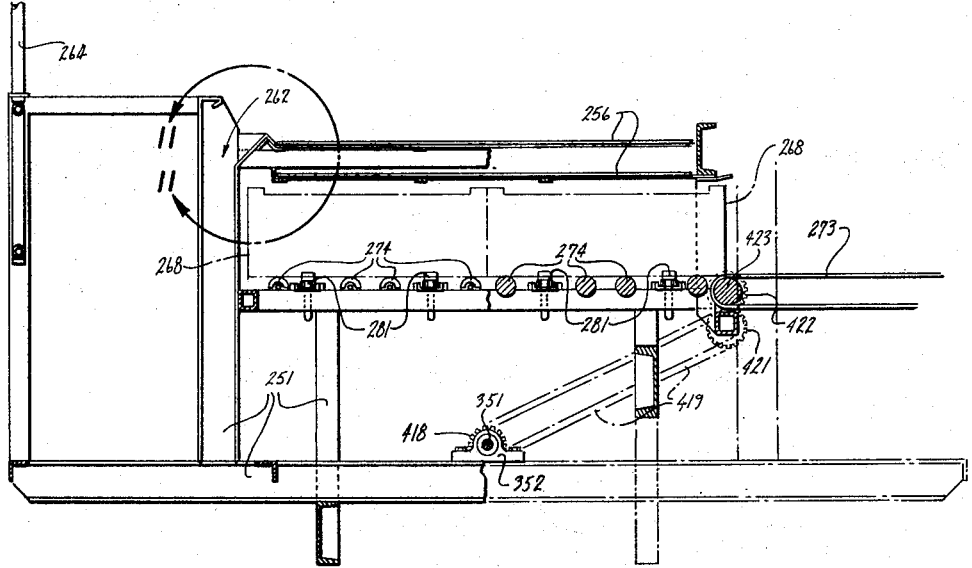
FIGURE 10 is an enlarged cross-sectional view taken along the line 10—10 of FIGURE 2.
Figure 11:
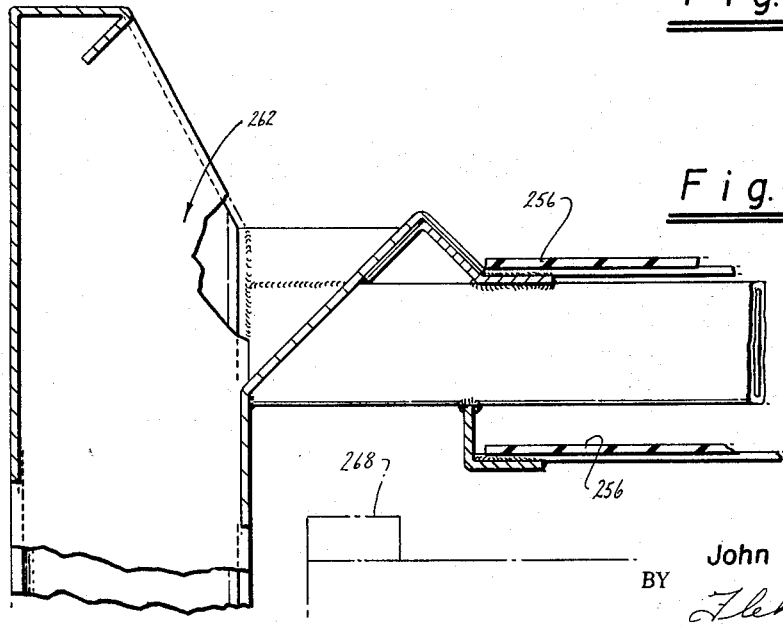
FIGURE 11 is an enlarged view of the construction enclosed by the line 11—11 in FIGURE 10.

The sorting and filling unit 12 is in the form of a trailer which has a framework 251 provided with steerable rear wheels 252. The front end of the framework 251 is connected to and supported by the rear portion of the tractor harvester unit 11 by turntable 253 of a substantially conventional type as shown in detail in FIGURES 5 and 9. Adjustable outriggers 254 are provided on the front end of the framework 251 to support the front end of the sorting and filling unit when it is disconnected from the tractor harvester unit.

A conveyor belt 256 is mounted on the top portion of the framework 251 of the sorting and filling unit 12 and is formed of a suitable impervious material such as rubber or canvas. The endless conveyor belt 256 is mounted upon rollers 257 and 258. As shown particularly in FIGURES 16A and 16B, the belt 256 is adapted to receive comestibles discharged from the comestible belt 146 of the tractor harvester unit 11. As can be seen from FIGURE 2, the conveyor belt 256 is a relatively long belt so that the material carried by the belt is open to inspection for a relatively long period of time. Walkways 261 have been provided in the framework 251 on opposite sides of the conveyor belt 256 so that approximately five workers can stand on each side of the conveyor belt to carry out the necessary sorting and inspection operations. Chutes 262 have been provided along opposite sides of the endless conveyor belt 256 so that workers on the walkways 261 can readily remove any undesired comestibles and any foreign objects such as rocks and deposit the same in the chutes 262 so that they can fall to the ground over which the sorting and filling unit 12 is travelling. A superstructure 264 has been provided on the framework 251 and can be utilized for supporting a canvas covering or the like to protect workers on the sorting and filling unit from the sun and inclement weather.

Means is provided on the sorting and filling unit for filling either boxes or bins with the comestibles being harvested. When boxes are being utilized, a truck 266 travels alongside the sorting and filling unit as shown in broken lines in FIGURE 2. In the arrangement shown in FIGURE 2, the filled boxes 267 are loaded on the end of the truck, whereas the empty boxes 268 are placed on a downwardly inclined box conveyor 271 of a substantially conventional type which is provided with rollers 272 so that the empty boxes will slide downwardly and forwardly by gravity and will move onto a continuously moving endless belt 273. The belt 273 causes the empty boxes to be continuously urged transversely of the sorting and filling unit 12 over a plurality of free-running rollers 274.

Indicating means is provided for indicating when the space overlying the rollers 274 is filled with empty boxes and consists of a flag 276 mounted upon a shaft 277 rotatably mounted on the framework 251 and having an operating finger 278 extending through a hole 279 in thef ramework 251. Spring means (not shown) is provided for yieldably urging the flag 276 and the finger 278 carried thereby in a direction so that the finger is moved inwardly. Thus, when boxes are disposed above the rollers 274 and are continuously urged into the space overlying the rollers 274, the box nearest the finger 278 will urge the finger 278 outwardly to thereby position the flag in such a manner that it extends at right angles to the longitudinal axis of the vehicle so that it is readily visible by an operator at the rear of the machine to indicate that boxes are ready to be advanced beneath the belt 256 as hereinafter described.

After the boxes have been positioned so that they overlie the rollers 274, means is provided for advancing two rows of boxes to the rear of the sorting and filling unit 12 so that they can be filled. In consists of four endless chains 281 (two for each row of boxes) which are mounted on sprockets 282 mounted upon shafts 283 and 284. The chains 281 are provided with lugs 286 which are adapted to engage the boxes and advance the same from off of the rollers 274 to the rear of the filling and sorting unit.

A discharge conveyor 291 is provided on the framework 251 of the sorting and filling unit 12 and can be utilized either for carrying boxes or for carrying comestibles. The conveyor 291 consists of a rigid framework 292 which has its lower extremity pivotally connected to the upper ends of a pair of links 293 at 294. The other ends of the links are pivotally connected to the main framework 251 of the sorting and filling unit 12 at points 295. This linkage permits the conveyor 291 to be moved from a lowermost position shown in solid lines in FIG- URE 8 to an uppermost position as shown in broken lines in FIGURE 8 for purposes hereinafter described. The discharge conveyor 291 also consists of a pair of endless chains 296 which ride upon upper guides 297 provided on opposite sides of the framework 292 and travel over sprockets 298 mounted on shafts 299, 301 and 302 rotatably mounted in the framework 292. Additional sprockets 304 are provided for supporting the lower runs of the chains 296, as shown particularly in FIGURE 15, and are affixed to shafts 306 which are rotatably mounted in the framework 292. Closely spaced rubber-covered rods 307 are connected between the endless chains 296.

As can be seen from FIGURE 15, the conveyor 291 is divided into two parts 291a and 291b, in which part 291b is mounted for pivotal movement on the shaft 301 relative to the part 291a so that the boxes or comestibles being carried thereby can be elevated to the desired position for loading onto a truck or other suitable transporting apparatus.

Means is provided for adjusting the angle of the part 291b relative to the part 291a and consists of a fluid actuator 309 which has one end connected to the part 291a and the other end connected to the part 291b, as shown particularly in FIGURE 15. Hydraulic fluid is supplied to the fluid actuator 309 through the hose 310 from a supply of fluid under pressure provided by the hydraulic pump 162 in the tractor harvester unit and supplied to the sorting and filling unit 12 through hoses 311 and controlled by the control device 312. The control device 312 is mounted on the rear of the sorting and filling unit 12 at a point where it will be accessible to an operator standing in the operator's station 313 of the sorting and filling unit. Hand rails 316 are provided on the conveyor 291 for use of the operator in the operator's station 313. A small roller 318 is mounted at the upper end of the part 291b and is provided to facilitate the unloading of boxes from the conveyor when boxes are being elevated by the conveyor. An end bar 319 is also mounted on the upper conveyor part 291b, as shown in FIGURE 15, to serve as a hand grip and also to facilitate unloading boxes from the conveyor.

When the conveyor 291 is utilized for loading comestibles directly into bins on trucks, a chute 321 is attached to the conveyor as shown in FIGURE 15A. The chute 321 is formed of suitable material such as soft rubber. A rigid framework 322 is provided on the upper end of the chute to form a mouth for receiving the tomatoes as they are discharged from the conveyor and includes rods 323 which have hooks 324 attached thereto extending through holes 326 provided in the framework 292 of the conveyor. In addition, another hook 327 is provided which is secured to the discharge conveyor framework 292 and which engages the framework 322 forming the mouth in the chute as shown in FIGURE 15A to prevent the mouth of the chute from tipping.

A pair of brackets 328 are provided on the chute 321 to retard the fall of the comestibles as they pass through the chute. These brackets consist of parts 328a and 328b which are secured to opposite sides of the chute by bolts 329. The parts 328b and 328a are then fastened together by bolts 331 and are adjusted to a position so that the opening through the chute is stretched sufficiently to retard the fall of the comestibles through the chute but not to stretch the opening so tight that the comestibles will be held back.

Figure 8:
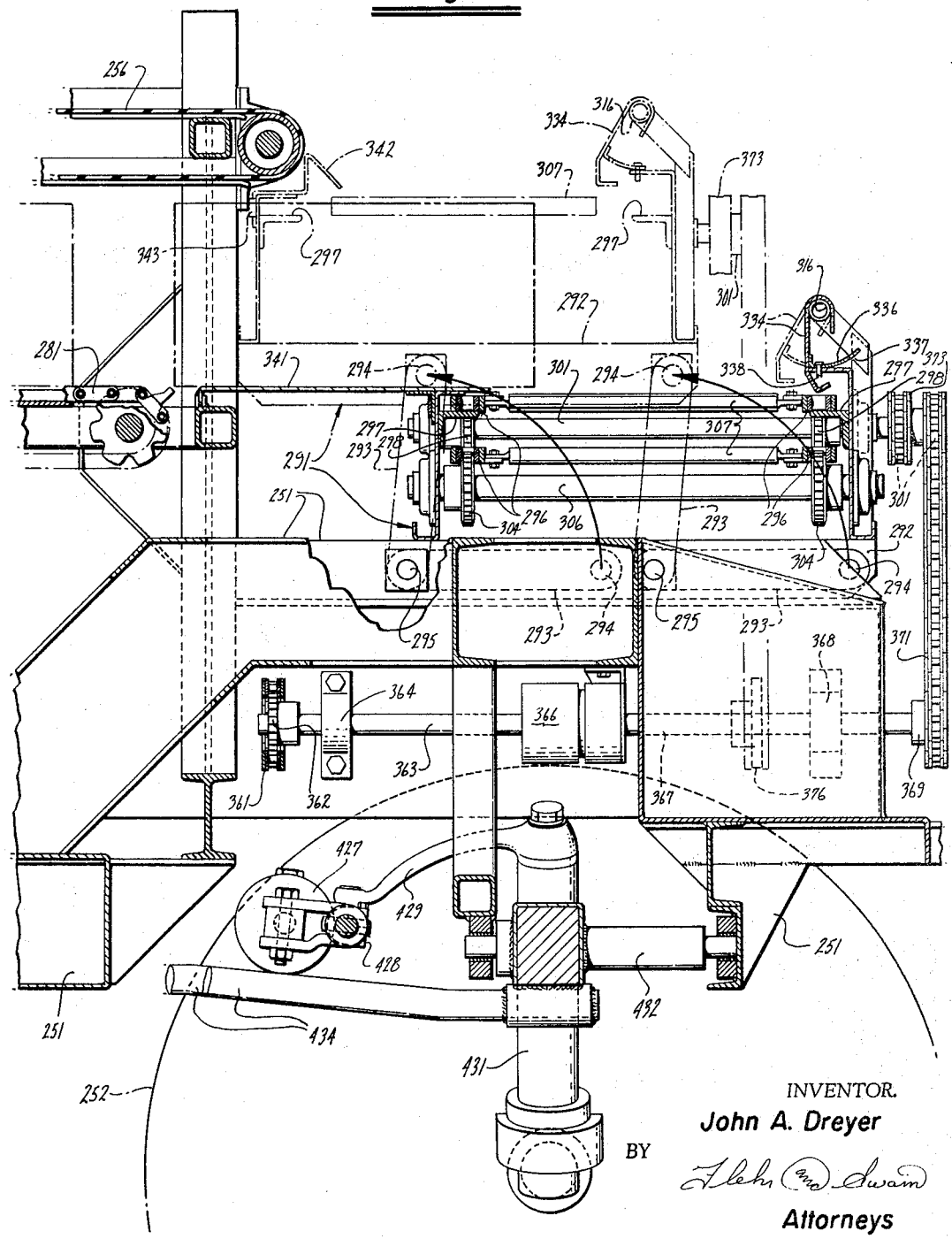
FIGURE 8 is a cross-sectional view taken along the line 8—8 of FIGURE 2.

Side guides 334 are mounted upon the rear side of the discharge conveyor and are pivotally mounted on the hand rails 316 as shown particularly in FIGURE 8. Means is provided for positioning the side guides between the extreme forward and extreme rearward positions and consists of curved members 336 which are secured to the side guides and which have holes 337 therein through which screws 338 can extend and be threaded into the framework 292 to hold the side guides in the desired position. Thus, when the side guide is in the rearward position as shown in solid lines in FIGURE 8, the guides are positioned so that the discharge conveyor can handle boxes, whereas when the side guides are moved to the position shown in broken lines, the side guides permit the comestibles to be discharged directly onto the discharge conveyor and prevent the comestibles from moving into the sides of the discharge conveyor.

A large plate which is removably mounted upon the framework 251 is provided for bridging the gap between the box conveyor belt 281 and the discharge conveyor 291 when the discharge conveyor is in its lowermost position and adapted to receive boxes.

When the discharge conveyor is moved from its lowermost position shown in solid lines in FIGURE 8, the plate 341 is removed and additional side guide members 342 are mounted on the near side of the discharge conveyor and are removably mounted in brackets 343.

*Filling and sorting unit drive mechanisms*

Means is provided for driving the various conveyors of the sorting and filling unit from the tractor harvester unit and consists of sections of line shaft 351 which are rotatably mounted on the sorting and filling unit 12 in pillow blocks 352 and which extend longitudinally of the sorting and filling unit 12. The line sections are connected by universal joints 353. An additional drive shaft section 354 is provided which is connected to the drive shaft 198 through a universal joint 356. The drive shaft sections 351 drive a gear box 358 mounted on the framework of the sorting and filling unit. The gear box 358 drives a sprocket 359 which drives a chain 361 which drives a sprocket 362 (see FIGURE 8). The sprocket 362 is affixed to a shaft 363 rotatably mounted in a pillow block 364. The shaft 363 is connected to a clutch 366. The clutch 366 is connected to a shaft 367 rotatably mounted in pillow blocks 368 and connected to a sprocket 369. The sprocket 369 drives a chain 371 which drives a pair of twin sprockets 372 rotatably mounted upon the pivot shaft 301. The twin sprocket 301 drives a chain 373 which drives a sprocket 374 affixed to the shaft 302 to provide the means for driving the discharge conveyor. The operation of the discharge conveyor is, therefore, under the control of the clutch 366.

Means is also provided for driving the discharge conveyor when it is in the uppermost position for receiving comestibles directly from the main conveyor belt 256 provided on the sorting and filling unit 12 and consists of a separate sprocket 376 which is mounted on the shaft 367. A drive chain of greater length than the drive chain 371 is required for making the connection between the sprocket 376 and the twin sprocket 372.

The gear unit 358 also drives a sprocket 381 which drives a chain 382. The chain 382 drives a sprocket 383 affixed to a shaft 384 which is rotatably mounted in a pillow block 386 and a bearing 387. A sprocket 388 is affixed to the shaft 384 and drives a chain 389 which drives a sprocket 391 affixed to a shaft 392 rotatably mounted in pillow blocks 393. The shaft 391 is connected to a snap-over clutch 394 of a conventional type. The snap-over clutch 394 is connected to the shaft 284 which is utilized for driving the box conveyor chains 281. The shaft 284 is rotatably mounted in bearings 396.

The snap-over clutch 394 is provided with an operating lever 398 which is pivotally connected to one end of a link 399. The other end of the link 399 is pivotally connected to a plate 401 which is pivotally mounted on ears 402. A stop 403 is mounted on the plate 401 and is adapted to be engaged by the lugs 286 provided on the conveyor chains 281. A loop 404 is secured to the bottom portion of the plate 401, and receives one end of an operating lever 406 which is pivotally mounted upon a post 407. The operating lever 406 is provided with a foot pedal 408 which is adapted to be operated by an operator in the operator's station 313 at the rear of the sorting and filling unit 12. Upon depressing of the foot pedal 408, the left end of the plate 401, as viewed in FIGURE 12, is moved upwardly to pull the link 399 to the left as viewed in FIGURE 12 to cause the clutch 394 to operate and to drive the shaft 284 and to thereby drive the box conveyor chains 281. Movement of the box conveyor chains continues until one of the lugs 286 strikes the stop 303 to move the plate 401 downwardly, as viewed in FIGURE 12, to disengage the snap-over clutch 394.

Means is also provided in the operator's station 313 for operating the clutch 366 which is utilized for driving the discharge conveyor 291 and consists of a lever 411 (see FIGURE 16B) which is connected by a linkage 412 to the clutch 366 to permit the operator to engage and disengage the clutch.

The shaft 384 also drives the main conveyor 256 on the sorting and filling unit 12 which is driven by the roller 258. The roller 258 is secured to a shaft 414 which is rotatably mounted in the framework and upon which a sprocket 416 is mounted. The sprocket 416 is driven by a chain 417 which is driven by a sprocket (not shown) secured to the shaft 384.

Means is provided for driving the small belt 273 from one of the drive shaft sections 351 and consists of a sprocket 418 which is mounted on one of the sections 351 and drives a chain 419. The chain drives a sprocket (not shown) which drives a spur gear 421. The spur gear 421 drives a spur gear 422 which is affixed to a roller 423 to drive the endless belt 273.

Means is provided for steering the rear wheels 252. It consists of control means 426 of a conventional type mounted on the sorting and filling unit and accessible to the operator standing in the station 313 which controls a hydraulic actuator 427 that is connected by substantially conventional linkages 428 to arms 429. As shown particularly in FIGURE 8, the arms 429 are rotatably mounted within a sleeve 431 that is supported upon a member 432 which is rotatably mounted within the framework 251. The cylinders 431 are also connected to the frame by a yoke 434.

*Operation*

Operation and use of my machine for harvesting comestibles may now be briefly described as follows. Let it be assumed that the machine is to be used for harvesting a comestible such as tomatoes and that the machine is travelling down a row of tomatoes as shown in FIGURES 16A and 16B. As hereinbefore explained, the guide wheels 71 are positioned so that the knife 66 travels just under the surface of the ground so as to sever the plant from the roots just immediately below the surface of the ground. As this is occurring, the upper portions of the plant are engaged by the reel 91 and are moved onto the pick-up conveyor 81 as shown in FIGURE 16A which elevates the tomato vines with the tomatoes thereon and discharges them onto the shaker mechanism 106. The shaker mechanism, as hereinbefore explained, operates continuously during the time that the pickup conveyor 81 is operating. The shaker mechanism 106 shakes the tomatoes from the vines and they pass between the spaced shaker members 107 and drop onto the porous tomato or comestible belt 146. As hereinbefore explained, the shaker mechanism is arranged so that the upward lift provided by the shaker members 107 on the tomato vines is substantially the same as the movement in the forward direction. This causes the tomatoes to be gently separated from the tomato vines and at the same time causes the tomato vines to progress slowly to the right as viewed in FIGURE 16A up the incline formed by the shaker members 107.

After substantially all of the tomatoes have been removed from the vines, the vines pass rearwardly down the slope provided by the members 112 and into the vine auger 136 which augers the vines laterally of the machine and discharges the same out the side of the machine onto the ground.

It is apparent that during the time that the tomatoes are being shaken from the vines, dirt, small pebbles, rocks and the like will also drop through the shaker members 107. Most of the finer particles will also pass through the tomato screen 146 and will drop upon the dirt belt 151 which discharges the dirt forwardly onto the ground as shown particularly in FIGURE 16A.

During the time this is occurring, the fan 141 is operating to provide a high velocity air stream which passes through the tomatoes as they are being discharged from the tomato belt onto the large sorting belt 256 provided on the sorting and filling unit to thereby remove any last remaining particles of dirt, leaves and the like to cause them to be blown forwardly onto the dirt belt 151 so that they are discharged in the forward portion of the machine.

After the tomatoes have been discharged onto the sorting belt 256, the tomatoes are advanced rearwardly with the sorting and filling unit to permit visual inspection of the tomatoes. Any undesirable tomatoes, rocks, and other debris which may possibly have passed through the tractor harvester unit 11 can be removed by the inspectors and deposited in the chutes 262 provided along opposite sides of the belt 256. As shown in FIGURE 16, the tomatoes are advanced by the belt 256 and are discharged directly into a pair of empty boxes 268 positioned side by side on the dead plate 341. As soon as the two boxes are filled, the operator depresses the foot pedal 408 to cause engagement of the snap-over clutch 394 to cause the shaft 284 and the four box chains 281 to be advanced moving to the rear of the two rows of boxes underlying the sorting belt or conveyor 256.

As the boxes are advanced rearwardly, the two boxes which have been filled are advanced onto the discharge conveyor 291 as shown in FIGURE 16B. Also, at the same time, two new unfilled boxes are advanced so that they are filled by the tomatoes being discharged from the sorting belt 256. Advancement of the boxes is automatically stopped when the lugs of the chain 281 engage the stop 403 to disengage the snap-over clutch 394. The two boxes which have been advanced onto the discharge conveyor 291 are advanced up the conveyor where they are taken by loaders on the truck 266 and stacked with the filled boxes 267 on the rear of the truck.

During the time that this is occurring, the two new boxes advanced to be filled by the belt 256 are being filled. As soon as they are filled, the foot pedal 408 can be operated to cause two new unfilled boxes to be advanced onto the conveyor and the two filled boxes to be advanced onto the discharge conveyor.

As rows of unfilled boxes are being advanced, these boxes are replenished by boxes 268 provided on the truck 266 travelling down the conveyor 272 and advanced by the belt 273 onto the rollers 274. Thus, each time two boxes are advanced to be filled, two new boxes are driven into position by the belt 273 so that they will be advanced by the next lugs 286 on the chains 281. As pointed out previously, the flag 276 gives an indication when the boxes have been properly advanced by the belt 273.

In the event it is desired to utilize bins for hauling the tomatoes to the packing plant, the bins can be placed on the truck 266 and filled directly on the truck by raising the conveyor to the dotted line position as shown in FIGURE 8 and attaching the chute 321 and permitting the bins to be discharged from the sorting belt 256 directly onto the discharge conveyor where they are elevated into the chute and dropped by the chute directly into the bin on the truck.

Although the machine shown in the drawings has been designed particularly for the harvesting of tomatoes, it is readily apparent that the machine can be adapted for harvesting other types of comestibles.

Since the machine is formed into two separate units, that is, a tractor harvester unit 11 and a sorting and filling unit 12, the machine is relatively maneuverable in the field and can turn relatively sharp corners. Also, because of dividing the machine into two separate units, the machine has a width which has been reduced sufficiently so that it can travel on conventional highways without any danger.

The operation of the shaker mechanism 106 which is utilized for removing the tomatoes from the vines is particularly important in view of the fact that it is necessary to remove the tomatoes from the vines without damaging or bruising the tomatoes. This is accomplished by utilizing the shaker type movement hereinbefore described and by utilizing shaker members which have rounded surfaces which are least likely to injure the tomatoes. The construction of the shaker mechanism 106 is also such that the movement of the tomato vines through the harvester is controlled solely by the movement of the shaker mechanism and the angle of incline of the shaker mechanism, making it possible to eliminate the use of any holdback or holddown units.

When it is desired to harvest tomatoes for seeds, the tomatoes from the harvester can be discharged directly into a pulper for removing the seeds rather than discharging the same onto a sorting and filling unit 12.

The guide wheels for guiding the knife blade 66 are mounted in such a manner that they run true and will not cause the knife blade to shift from side to side.

The machine is also particularly versatile in that the comestibles being harvested can be either loaded into boxes or into large bins. The sorting and filling unit is constructed in such a manner that the sorting operation can be accomplished with a minimum number of personnel and the operation of the sorting and filling unit itself can be controlled by one person who also can control the movement of boxes underneath the sorting conveyor 256 and the elevation by the discharge conveyor 291.

I claim:

1. In a machine for harvesting comestibles having a wheeled framework, a shaker mechanism mounted on the wheeled frame and having spaced apart members, means mounted on the framework and connected to the shaker members causing vibratory movement of the shaker members, means for delivering comestible bearing plants to the shaker mechanism, the said movement of the shaker mechanism causing the comestibles to be separated from the plants and to drop between the spaced apart members of the shaker mechanism, and a conveyor for receiving comestibles as they drop through the shaker mechanism; the combination therewith of a sorting and filling unit disposed rearwardly of said shaker mechanism and having a sorting conveyor receiving comestibles from the first named conveyor, means for delivering a plurality of boxes into a position so that they can be sequentially filled from the sorting conveyor, a discharge conveyor movable between upper and lower positions, the discharge conveyor in its lower position being adapted to receive boxes after they have been filled by the sorting conveyor, said discharge conveyor having means for advancing the boxes after they have been positioned thereon, and said discharge conveyor in its upper position being adapted to receive the discharged comestibles directly from the sorting conveyor.

2. Apparatus as set forth in claim 1 including means for causing boxes to be periodically delivered to be filled by the sorting conveyor, and means for automatically stopping the advance of boxes when boxes have been moved into a filling position.

3. Apparatus as set forth in claim 1 including a chute mounted on the end of said discharge conveyor, and means mounted on the chute for retarding the fall of comestibles through the chute.

4. In a machine for harvesting comestibles having a wheeled framework, a shaker mechanism mounted on the wheeled framework and having spaced apart members, means mounted on the framework and connected to the shaker members causing vibratory movement of the shaker members, means for delivering comestible bearing plants to the shaker mechanism, the said movement of the shaker mechanism causing the comestibles to be separated from the plants and to drop between the spaced apart members of the shaker mechanism, and a conveyor for receiving comestibles as they drop through the shaker mechanism; the combination therewith of a sorting and filling unit disposed rearwardly of said shaker mechanism and having a sorting conveyor extending rearwardly and in general alignment with said first main conveyor and adapted to receive comestibles from the latter, a box conveyor underlying said sorting conveyor for delivering boxes into a position adjacent the rear end portion of said sorting conveyor for sequential filling thereof, a discharge conveyor extending generally normal to said box conveyor and said sorting conveyor and adapted to advance and remove boxes after they have been filled by the sorting conveyor, and said box conveyor, said sorting conveyor and said discharge conveyor all being generally horizontally disposed.

References Cited by the Examiner

UNITED STATES PATENTS

| | | | |
|---|---|---|---|
| 2,337,615 | 12/1943 | McLaren. | |
| 2,578,189 | 12/1951 | Johnston | 171—121 XR |
| 2,671,999 | 3/1954 | Hardigg | 171—131 XR |
| 3,070,944 | 1/1963 | Peto et al. | 56—327 |
| 3,193,020 | 7/1965 | Button | 56—327 XR |
| 3,199,604 | 8/1965 | Lorenzen et al. | 171—27 |

ABRAHAM G. STONE, *Primary Examiner.*

ANTONIO F. GUIDA, *Examiner.*